US007433492B2

(12) United States Patent
Nambudiri et al.

(10) Patent No.: US 7,433,492 B2
(45) Date of Patent: Oct. 7, 2008

(54) METHOD AND SYSTEM FOR REDUCING INK CONSUMPTION REQUIRED FOR PRINTING

(75) Inventors: Easwaran Nambudiri, Rye Brook, NY (US); John P. Miller, Shelton, CT (US); Lun Chan, New Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 671 days.

(21) Appl. No.: 10/897,470

(22) Filed: Jul. 23, 2004

(65) Prior Publication Data

US 2006/0017758 A1 Jan. 26, 2006

(51) Int. Cl.
*G06K 9/00* (2006.01)
*B41J 29/38* (2006.01)

(52) U.S. Cl. ........................................ 382/101; 347/14

(58) Field of Classification Search ................ 382/101; 347/14

See application file for complete search history.

(56) References Cited

U.S. PATENT DOCUMENTS

| | | | | |
|---|---|---|---|---|
| 4,617,580 | A | 10/1986 | Miyakawa | |
| 5,157,253 | A | 10/1992 | Strohmeyer et al. | |
| 5,488,223 | A | 1/1996 | Austin et al. | |
| 5,801,722 | A * | 9/1998 | Ueda et al. | 347/16 |
| 6,398,333 | B1 * | 6/2002 | Mulay et al. | 347/14 |
| 6,435,642 | B1 | 8/2002 | Jackson et al. | 347/19 |
| 6,561,612 | B2 * | 5/2003 | Minckler | 347/19 |
| 6,612,676 | B1 | 9/2003 | Minckler | 347/19 |
| 6,678,072 | B1 * | 1/2004 | Matsuoka et al. | 358/2.1 |
| 6,895,395 | B1 * | 5/2005 | Blanluet et al. | 705/408 |
| 2002/0130182 | A1 * | 9/2002 | Mondie | 235/468 |
| 2004/0064424 | A1 * | 4/2004 | Schilling et al. | 705/406 |

* cited by examiner

*Primary Examiner*—Brian Quang Le
*Assistant Examiner*—Amara Abdi
(74) *Attorney, Agent, or Firm*—Brian A. Lemm; Angelo N. Chaclas

(57) ABSTRACT

A printing system that dynamically adjusts the resolution at which printing will occur based on the lightness or darkness of the medium upon which the image will be printed is provided. The reflectivity of the medium upon which an image is to be printed is determined, and hence the relative lightness or darkness of the medium. The resolution at which the image will be printed is adjusted based on the determined reflectivity of the medium. For lighter colored mediums, sufficient contrast between the printed image and the medium upon which the image is printed can be maintained utilizing a lower resolution, while a higher resolution must be utilized to maintain sufficient contrast for darker colored mediums. Since it is not necessary to utilize the higher resolution for all mediums to ensure sufficient contrast is always provided, the amount of ink used by the printing system is reduced.

9 Claims, 2 Drawing Sheets

METHOD AND SYSTEM FOR REDUCING INK CONSUMPTION REQUIRED FOR PRINTING

FIELD OF THE INVENTION

The invention disclosed herein relates generally to printing systems, and more particularly to a method and system for reducing ink consumption required for printing by printing systems in mail processing systems.

BACKGROUND OF THE INVENTION

Mail processing systems for printing postage indicia on envelopes and other forms of mail pieces have long been well known and have enjoyed considerable commercial success. There are many different types of mail processing systems, ranging from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Typically, a control device, such as, for example, a microprocessor, performs user interface and controller functions for the mailing machine. Specifically, the control device provides all user interfaces, executes control of the mailing machine and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The control device, in conjunction with an embedded PSD, constitutes the system meter that satisfies U.S. information-based indicia postage meter requirements and other international postal regulations regarding closed system meters. The United States Postal Service (USPS) initiated the Information-Based Indicia Program (IBIP) to enhance the security of postage metering by supporting new methods of applying postage to mail. The USPS has published draft specifications for the IBIP. The requirements for a closed system are defined in the "Performance Criteria for Information-Based Indicia and Security Architecture for Closed IBI Postage Metering System (PCIBI-C), dated Jan. 12, 1999. A closed system is a system whose basic components are dedicated to the production of information-based indicia and related functions, similar to an existing, traditional postage meter. A closed system, which may be a proprietary device used alone or in conjunction with other closely related, specialized equipment, includes the indicia print mechanism.

The PCIBI-C specification defines the requirements for the indicium to be applied to mail produced by closed systems. An example of such an indicium is illustrated in FIG. 1. The indicium 10 consists of a two-dimensional (2D) barcode 12 and certain human-readable information 14. Some of the data included in the barcode can include, for example, the PSD manufacturer identification, PSD model identification, PSD serial number, values for the ascending and descending registers of the PSD, postage amount, and date of mailing. In addition, a digital signature is required to be created by the PSD for each mail piece and placed in the digital signature field of the barcode. Verification of indicium is performed by the postal service scanning a mail piece to read the 2D barcode and verifying the information contained therein, including the digital signature. If the verification is unsuccessful, indicating that the indicium may not be authentic, the mail piece may not be delivered.

Since postal services accept indicia printed by mail processing systems as conclusive proof of payment of the amount of postage indicated, such devices are in effect machines for printing money. As a result postal services have imposed high standards for the print quality of indicia images produced by such machines, including, for example, resolution of the image. Even if an indicium is valid, if the verification equipment is unable to read the indicium due to poor print quality, verification will not be possible. It is therefore necessary to ensure that the printing systems utilized by the mail processing systems are capable of consistently producing high quality images.

In recent years, ink jet printing systems have been utilized in mail processing systems. Ink jet printing systems, as used herein, includes any form of printing wherein print control signals control a print mechanism to eject ink drops to produce a matrix of pixels, i.e. picture elements, to represent an image. An ink supply, typically in the form of a reservoir, supplies ink to the print mechanism. As the ink supply is depleted, it must be replaced by an operator. The cost for periodically replacing the ink supply can be significant, especially for high volume mail processing systems that can process 20,000 mail pieces or more per hour and typically operate for twenty-four hours every day for extended periods of time. As such, it is desirable to utilize the minimum amount of ink necessary for each indicium, while still meeting the print quality requirements to ensure each indicium can be read. The printing system can be set to a resolution of, for example, 200×300 dpi, i.e., 200 per inch horizontal resolution and 300 dots per inch vertical resolution. This resolution will provide sufficient contrast with respect to a typical medium, i.e., mail piece, upon which an indicium will be printed, such as, for example, a white envelope. This resolution, however, may not provide sufficient contrast if a darker medium is used, such as, for example, manila or gray envelopes, where a higher resolution in the vertical direction is required. For darker colored mail pieces, it may be necessary to have a higher resolution, such as, for example, 200×600 dpi, to provide sufficient contrast for the indicium to be properly read. Setting the printing system to the higher resolution, however, uses more ink per indicium than the lower resolution. Thus, if the resolution is set based on the darker medium, it will result in a significant amount of ink being wasted when printing on the lighter medium, as the extra ink is not necessary to meet the contrast requirements. The extra unnecessary ink required can significantly increase the cost of operating the mailing machine.

Thus, there exists a need for a method and system that reduces the amount of ink consumption required for printing while still meeting the required print quality standards for different mediums.

SUMMARY OF THE INVENTION

The present invention alleviates the problems associated with the prior art and provides methods and systems that reduce the amount of ink consumption required for printing while still meeting the required print quality standards for different mediums.

In accordance with embodiments of the present invention, a printing system is provided that dynamically adjusts the resolution at which printing will occur based on the lightness or darkness of the medium upon which the image will be printed. The reflectivity of the medium upon which an image is to be printed is determined, and hence the relative lightness or darkness of the medium. The resolution at which the image will be printed is adjusted based on the determined reflectivity of the medium. For lighter colored mediums, sufficient contrast between the printed image and the medium upon which the image is printed can be maintained utilizing a lower resolution, while a higher resolution must be utilized to maintain sufficient contrast for darker colored mediums. Since the resolution is adjusted for each different medium, it is not necessary to utilize the higher resolution for all mediums to ensure sufficient contrast is always provided, thereby reducing the amount of ink used by the printing system while still ensuring sufficient contrast between the printed image and the medium upon which the image is printed.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
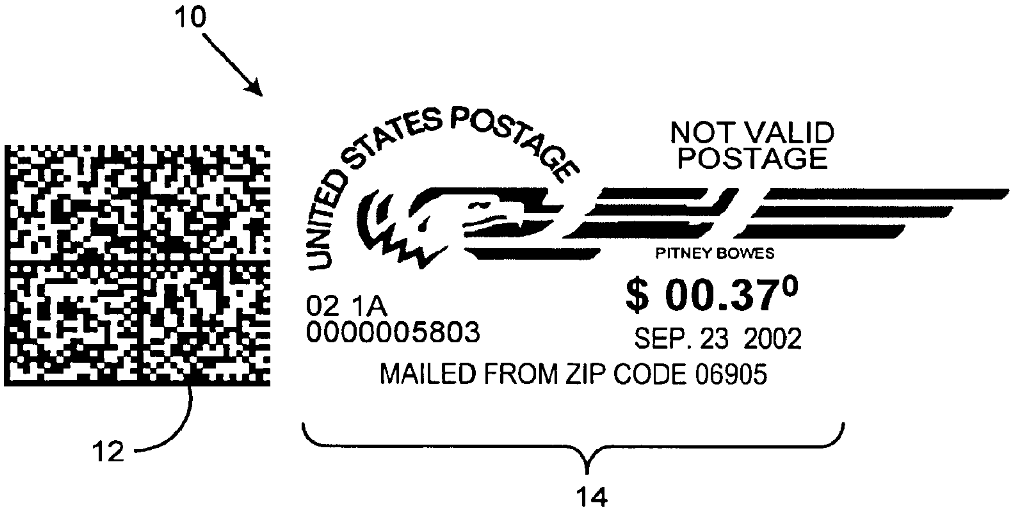
FIG. 1 ( PRIOR ART )
FIG. 1 illustrates an example of an indicium that meets the IBIP specifications.
Figure 2:
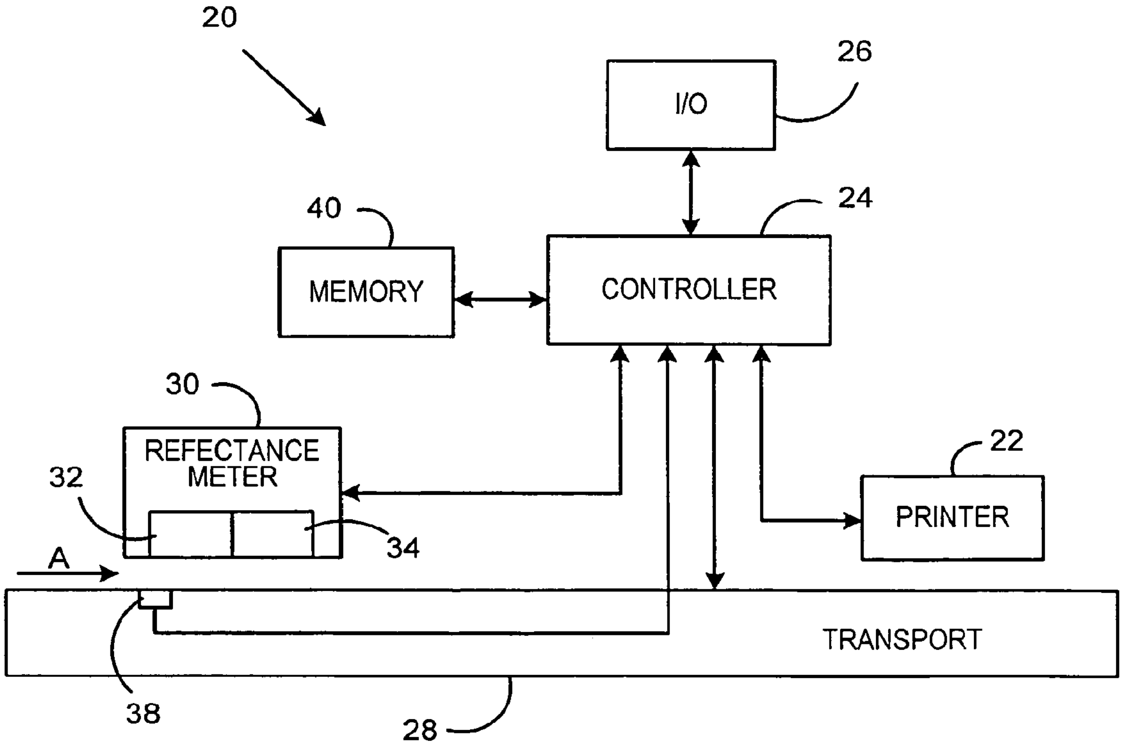
FIG. 2 illustrates in block diagram form a portion of a mail processing system according to the present invention.

In describing the present invention, reference is made to the drawings, wherein there is seen in FIG. 2 a portion of a mail processing system 20 according to an embodiment of the present invention. It should be noted that while the following description is being made with respect to a mail processing system, the present invention is not so limited and can be utilized in any type of printing system that must print images to meet specified contrast requirements. Mail processing system 20 includes a controller 24, that preferably includes one or more controller units, such as, for example, a microprocessor, general or special purpose processor or the like, to control operation of the mail processing system 20. A memory 40 is coupled to the controller 24 for storage of data. Controller 24 is coupled to one or more input/output devices 26, such as, for example, a keyboard and/or display unit for the input and output of various data and information. A printer 22, preferably an ink jet printer adapted to print postage indicia generated by the controller 24 on mail pieces, is coupled to controller 24. A transport 28, including, for example, rollers and/or belts, is utilized to transport mail pieces through the mail processing system 20 in the direction indicated by arrow A based on signals provided from the controller 24. The transport 28 will transport the mail pieces past the printer 22 such that printing can occur on each mail piece. Sensors, such as, for example, sensor 38, located along the transport 28 provide signals to the controller 24 to indicate the position of a mail piece on the transport 28.

According to embodiments of the present invention, mail processing system 20 can dynamically adjust the resolution with which each indicium is printed to ensure sufficient contrast with the medium upon which each indicium is printed, thereby reducing the ink consumption required for printing while still meeting print quality standards. Mail processing system 20 includes a reflectance meter 30, that includes one or more light sources 32 and one or more photodetectors 34. Reflectance meter 30 could be, for example, a spectrophotometer. As a mail piece is being transported by transport 28 past the reflectance meter 30, light is applied to the mail piece by the light source 32. The light reflected from the mail piece is received by the photodetectors 34. Based on the amount of reflected light received by the photodetectors 34, the relative darkness or lightness of the mail piece can be determined. The amount of reflected light is less for a darker mail piece than a lighter mail piece, as the darker mail piece will absorb part of the applied light from the light source 32, while a lighter mail piece will have less absorption of the applied light and therefore more reflected light.

The reflected light signals received by the photodetectors 34 are processed by the reflectance meter 30 to determine the lightness or darkness of the mail piece. Such processing could include, for example, amplification of the signals by conventional amplifiers to provide a range of voltages that correspond to the amount of reflectance between 0 and 100%. The reflectance, as determined by the reflectance meter 30, is provided to the controller 24. Alternatively, processing of the reflected light signals could be done by the controller 24. In either case, once the controller 24 has either received or determined the reflectance of the mail piece, the controller 24 can determine the relative lightness or darkness of the mail piece and, based on the lightness or darkness of the mail piece, determine if the resolution for an indicium that will be printed on the mail piece can be a low resolution, such as, for example, 200×300 dpi, or a high resolution, such as, for example, 200×600 dpi. It should be understood while the present invention is being described utilizing resolutions of 200×300 dpi and 200×600 dpi, these resolutions are exemplary in nature and any resolution values desired could be utilized. Determination of the resolution could be performed, for example, utilizing a threshold number for the reflectivity. Thus, for example, if the reflectivity is less than 50%, indicating that more than half of the applied light was absorbed by the mail piece, the controller 24 can determine that the mail piece is a darker medium that requires a higher resolution, e.g., 200×600 dpi, to ensure sufficient contrast of the indicium with the mail piece. Conversely, if the reflectivity is greater than or equal to 50%, indicating that most of the light was reflected by the mail piece, the controller 24 can determine that the mail piece is a lighter medium, and a low resolution, e.g., 200×300 dpi, will provide sufficient contrast of the indicium with the mail piece. Alternatively, the reflectivity could be determined, for example, by controller 24 utilizing a look-up table stored in memory 40. Reflectivity could also be determined based on comparison with a reference medium, especially in the case when large batches of the same type of mail piece will be processed. In this scenario, before a large batch of mail is processed, a reference medium, such as, for example, a standard white envelope, could be processed through the system 20 (preferably without actually printing an indicium thereon or just a test indicium that has no value) and the reflectivity of the reference medium set as a benchmark. A mail piece from the batch can then be processed by the system 20, and the reflectivity of the mail piece compared to the benchmark (or some associated range around the benchmark) established by the reference medium. If the reflectivity of the mail piece is within the associated range, the controller 24 can determine that the mail pieces of the batch are light and that a low resolution can be utilized to print on the batch of mail pieces.

Based on the determination made by the controller 24, a signal is sent to the printer 22 to adjust the resolution for the mail piece upon which an indicium is about to be printed. The printer 22, in response to receiving the signal from the controller 24, will adjust the resolution at which it will print accordingly, and as the mail piece is passed beneath the printer 22, an indicium will be printed on the mail piece at the resolution specified by the controller 24 for that mail piece.

Figure 3:
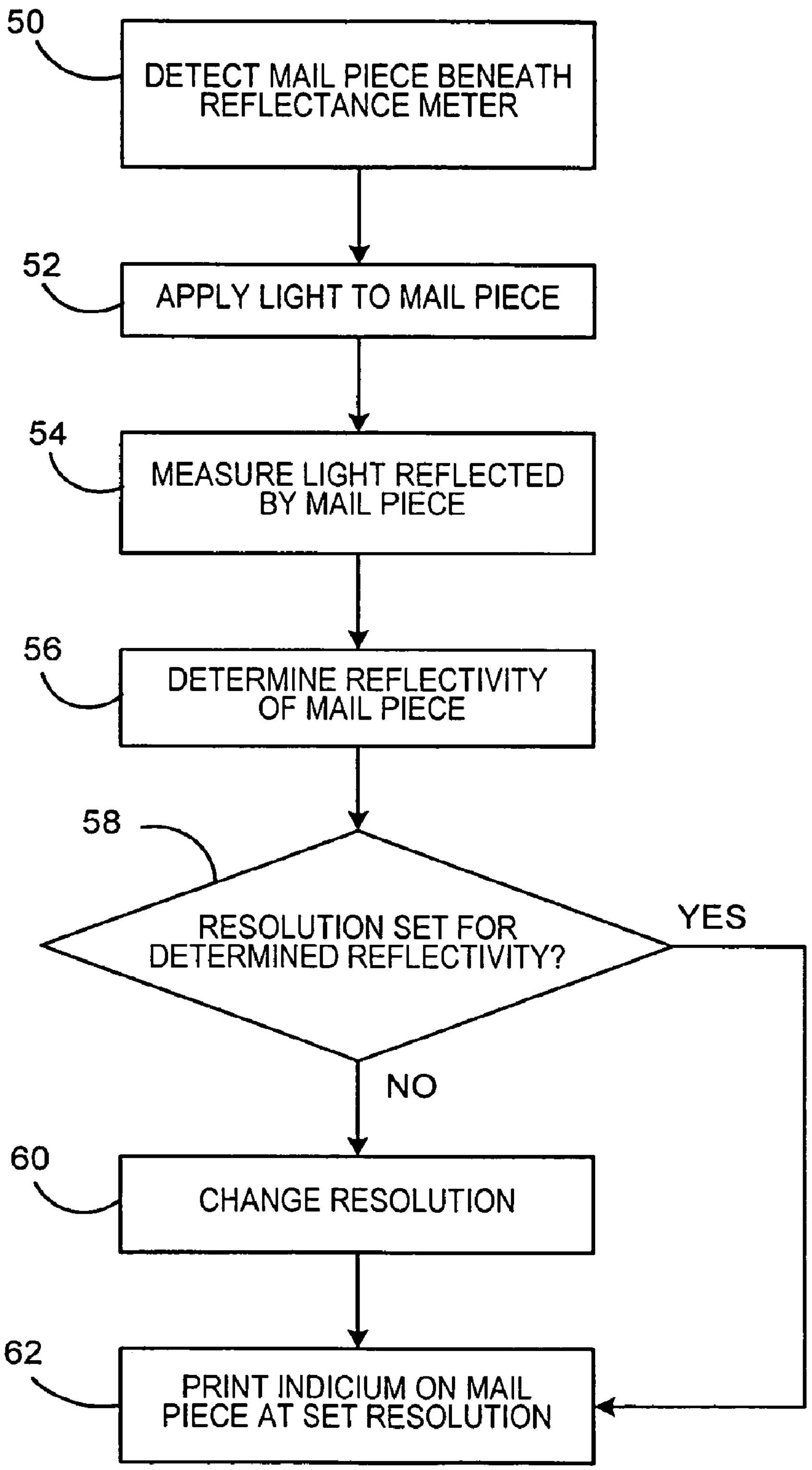
FIG. 3 illustrates in flow chart form an example of the processing of mail pieces performed by the mail processing system of FIG. 2.

Referring now to FIG. 3, there is illustrated in flow chart form an example of the processing of mail pieces performed by the mail processing system of FIG. 2. Preferably, the processing as illustrated in FIG. 3 is performed on each mail piece processed by the mail processing system 20. When mail processing system 20 is first put into use, the printer 22 could be set to print at a resolution of, for example, 200×300 dpi as the default resolution. As mail pieces are input to the mail processing system 20, the transport 28 will transport the mail pieces through the system 20. In step 50, a mail piece is detected beneath the reflectance meter 30 by the sensor 38. Once a mail piece has been detected, then in step 52 the light source 32 is activated to apply light to the mail piece. Optionally, the light source 32 could always be activated instead of being turned on and off. In step 54, the light reflected by the mail piece is measured by the photodetectors 34. In step 56, based on the amount of light reflected, the reflectivity of the mail piece is determined, and hence the relative lightness or darkness of the mail piece. As noted above, the amount of reflected light is less for a darker mail piece than a lighter mail piece, as the darker mail piece will absorb part of the applied light from the light source 32, while a lighter mail piece will have less absorption of the applied light and therefore more reflected light.

In step 58, it is determined if the resolution at which the printer 22 will print is set for the determined reflectivity to provide sufficient contrast between the printed image and the mail piece. Thus, for example, for lighter colored mail pieces that have a higher reflectivity, a resolution of 200×300 dpi should provide sufficient contrast. For darker colored mail pieces that have a lower reflectivity, a higher resolution of, for example, 200×600 dpi may be required to provide sufficient contrast. If the resolution is set such that sufficient contrast will be provided, then in step 62 the printer 22 will print the image, i.e., an indicium evidencing payment of postage, on the mail piece at the set resolution. If in step 58 it is determined that the resolution is not set for the determined reflectivity, then in step 60 the resolution is changed for the determined reflectivity and in step 62 the image is printed on the mail piece at the set resolution. It should be noted that the change of the resolution in step 60 can be either from low to high, e.g., 200×300 dpi to 200×600 dpi, or high to low, e.g., 200×600 dpi to 200×300 dpi. Thus, if the printer 22 is currently set at the higher resolution (e.g., 200×600 dpi) based on a previous darker mail piece that was just processed, and a lighter mail piece follows the darker mail piece, the printer 22 will change the resolution to the lower resolution (e.g., 200×300 dpi) for the lighter mail piece, thereby utilizing less ink to print the image on the lighter colored mail piece. Alternatively, the printer 22 could revert back to the default resolution (e.g., 200×300 dpi) after every mail piece, and change to the higher resolution only when a darker colored mail piece is being processed.

By dynamically changing the resolution at which the images are printed by the printer 22 based on the lightness or darkness of the mail piece upon which the images are printed, the mail processing system 20 provides images having sufficient contrast with each mail piece while utilizing less ink, thereby decreasing the operating costs for the mail processing system 20.

Thus, a printing system is provided that dynamically adjusts the resolution at which printing will occur based on the lightness or darkness of the medium upon which the image will be printed. The reflectivity of the medium upon which an image is to be printed is determined, and hence the relative lightness or darkness of the medium. The resolution at which the image will be printed is adjusted based on the determined reflectivity of the medium. For lighter colored mediums, sufficient contrast between the printed image and the medium upon which the image is printed can be maintained utilizing a lower resolution, while a higher resolution must be utilized to maintain sufficient contrast for darker colored mediums. Since the resolution is adjusted for each different medium, it is not necessary to utilize the higher resolution for all mediums to ensure sufficient contrast is always provided, thereby reducing the amount of ink used by the printing system while still ensuring sufficient contrast between the printed image and the medium upon which the image is printed.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for printing an image on a mail piece comprising:

determining whether the mail piece has a light color or a dark color based on a reflectivity of the mail piece;

printing the image on the mail piece using a first resolution if it is determined that the mail piece has a light color; and printing the image on the mail piece using a second resolution if it is determined that the mail piece has a dark color, the second resolution being greater than the first resolution.

2. The method of claim 1, wherein determining whether the mail piece has a light color or a dark color further comprises:

applying light to the mail piece;

measuring light reflected by the mail to determine a reflectivity of the mail piece;

comparing the determined reflectivity to a threshold value;

determining that the mail piece has a light color if the determined reflectivity is greater than the threshold value; and determining that the mail piece has a dark color if the determined reflectivity is not greater than the threshold value.

3. The method of claim 1, wherein the first resolution is 200×300 dpi, and the second resolution is 200×600 dpi.

4. The method of claim 1, wherein the image includes at least a portion of an indicium evidencing payment of postage for the mail piece.

5. A method for reducing ink consumption utilized during printing of mail pieces by a mail processing system comprising:

determining a relative lightness or darkness of each mail piece based on a reflective of each of mail piece being processed by the mail processing system;

selecting a resolution for printing on each mail piece based on the determined relative lightness or darkness for each mail piece;

if it is determined that a mail piece has a light color, using a first resolution for printing on the mail piece, the first resolution providing a contrast that meets a predetermined contrast level for the light color; and if it is determined that a mail piece has a dark color, using a second resolution for printing on the mail piece, the second resolution being greater than the first resolution and using more ink than the first resolution; the second resolution providing a contrast that meets more the predetermined contrast level for the dark color, whereby using the first resolution for mail pieces with a light color and the second resolution for mail pieces with a dark color consumes less ink than using the second resolution for all mail pieces while still meeting the predetermined contrast level.

6. The method of claim 5, wherein the first resolution is 200×300 dpi, and the second resolution is 200×600 dpi.

7. A system for processing mail pieces comprising:

a reflectance meter, the reflectance meter determining a reflectivity of mail pieces being processed by the system;

a printer adapted to print images on the mail pieces, the printer having a plurality of resolutions at which images can be printed; and a controller coupled to the reflectance meter and the printer, the controller determining whether a mail piece has a light color or a dark color based on a reflectivity of the mail piece, the controller further selecting a first resolution for printing an image on the mail piece if it is determined that the mail piece has a light color, and selecting a second resolution for printing the image on the mail piece if it is determined that the mail piece has a dark color, the second resolution being greater than the first resolution, the controller further providing a signal to the printer, the printer in response to the signal sent from the controller using the resolution selected by the controller for printing the image on the mail piece.

8. The system of claim 7, wherein the reflectance meter further comprises:

a light source for applying light to each mail piece; and a photodetector to detect the applied light that is reflected by each mail piece.

9. The system of claim 7, wherein the first resolution is 200×300 dpi, and the second resolution is 200×600 dpi.

* * * * *